US008510389B1

(12) United States Patent
Gurajada et al.

(10) Patent No.: US 8,510,389 B1
(45) Date of Patent: Aug. 13, 2013

(54) AUTOMATED RANKING OF ELECTRONIC COMMUNICATIONS

(75) Inventors: Subramanyam Venkata Gurajada, Gudur (IN); Ankur P. Panchbudhe, Pune (IN); Amol S. Katkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 697 days.

(21) Appl. No.: 11/648,509

(22) Filed: Dec. 29, 2006

(51) Int. Cl.
*G06F 15/16* (2006.01)

(52) U.S. Cl.
USPC .............................. 709/206; 709/205; 709/207

(58) Field of Classification Search
USPC .................................................. 709/205, 206
See application file for complete search history.

(56) References Cited

U.S. PATENT DOCUMENTS 5,987,503 A * 11/1999 Murakami ..................... 709/204
7,334,062 B1 * 2/2008 Agarwal et al. ................ 710/52
2005/0159970 A1 * 7/2005 Buyukkokten et al. ........... 705/1
2008/0040474 A1 * 2/2008 Zuckerberg et al. .......... 709/224
2008/0162640 A1 * 7/2008 Boss et al. .................... 709/206

OTHER PUBLICATIONS

Neustaedter et al., "Beyond 'From' and 'Received': Exploring the Dynamics of Email Triage," Late Breaking Results: Short Papers, CHI 2005, Apr. 2-7, 2005, Portland, Oregon, ACM 1-59593-002-7/05/0004, pp. 1977-1980.
Neustaedter, et al., "The Social Network and Relationship Finder: Social Sorting for Email Triage," Jul. 2005, CEAS 2005, 8 pages.
Chirita et al., "MailRank: Using Ranking for Spam Detection," CIKM'05, Oct. 31-Nov. 5, 2005, Bremen, Germany, Copyright 2005, ACM 1-59593-140-6/05/0010, 8 pages.

* cited by examiner

*Primary Examiner* — Umar Cheema
(74) *Attorney, Agent, or Firm* — Campbell Stephenson LLP

(57) ABSTRACT

Various methods and systems for automatically ranking electronic communications such as emails based on both content and social factors are disclosed. One method assigns a rank to an electronic communication, where assigning the rank involves both assigning a content-based rank to the electronic communication and assigning a social rank to the electronic communication. The rank assigned to the electronic communication can include both the content-based and social rank. Alternatively, the rank can be derived from the content-based and social ranks (e.g., the rank can be an average of the content-based and social ranks).

16 Claims, 6 Drawing Sheets

AUTOMATED RANKING OF ELECTRONIC COMMUNICATIONS

FIELD OF THE INVENTION

This invention relates to managing data and, more particularly, to ranking electronic communications.

DESCRIPTION OF THE RELATED ART

Innovations such as email and instant messaging have changed the way people communicate. These forms of electronic communication allow people to quickly and easily convey information to each other. For example, one employee can draft an electronic document and store that document on a server that is accessible to other employees, allowing the other employees to access the document at their convenience, without having to obtain a physical copy of the document. As another example, people can easily send and receive text messages or emails.

As people increase their usage of electronic forms of communication, however, new problems have begun to arise. One such problem is the management of the electronic communications themselves. For example, many corporations archive the emails sent and received by employees. As the number of emails to be archived increases, it becomes increasingly difficult to effectively provide access to the archived email. For example, if the archival system includes a search interface, the sheer volume of archived emails may lead to the search results returned for a relatively generic search query easily exceeding the number of results that can be quickly and easily navigated by a user. Such voluminous results are also likely to contain many results that are not relevant or useful to the user, and these irrelevant results may be just as likely to be returned at the top of the list of search results as more relevant search results.

The inability to identify desirable search results decreases the overall value of the archival system, since this inability decreases the likelihood of users actually making use of the search interface. As this example shows, new techniques for managing the increasing volume of electronic communication are desirable.

SUMMARY

Various embodiments of methods and systems for automatically ranking electronic communications such as emails based on both content and social factors are disclosed. In one embodiment, a method assigns a rank to an electronic communication, where assigning the rank involves both assigning a content-based rank to the electronic communication and assigning a social rank to the electronic communication. The rank assigned to the electronic communication can include both the content-based and social rank. Alternatively, the rank can be derived from the content-based and social ranks (e.g., the rank can be an average of the content-based and social ranks).

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
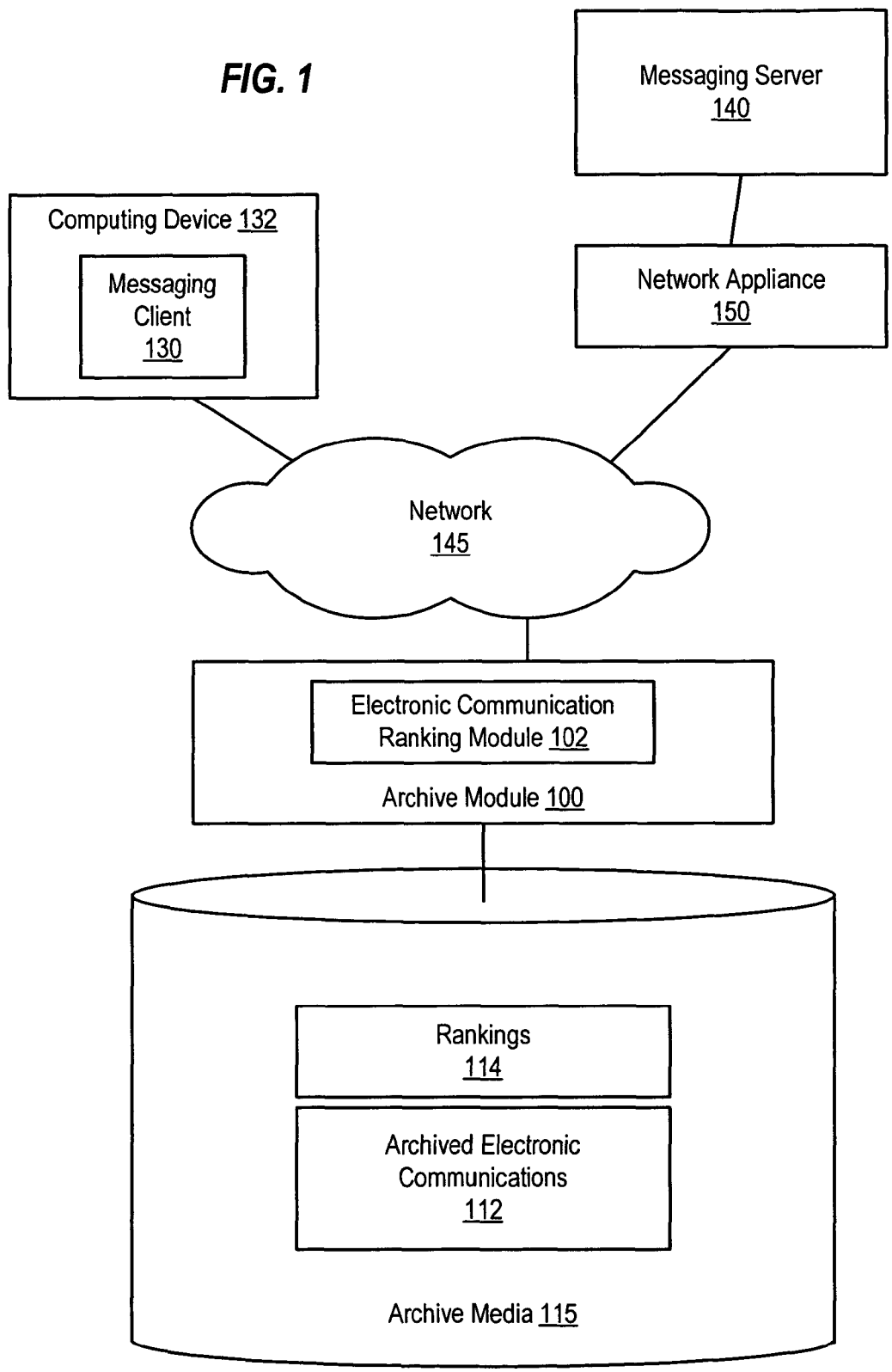
FIG. 1 is a block diagram of a system that archives electronic communications, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that archives electronic communications. In this example, an archive module 100 includes an electronic communication ranking module 102. Archive module 100 is configured to archive electronic communications by storing archival copies (archived electronic communications 112) and rankings 114 of those electronic communications on archive media 115. Archive media 115 can include one or more tapes, hard drives, compact discs (CDs) or digital video discs (DVDs), storage appliances such as EMC Centera™ from EMC Corporation and NetApp SnapLock™ from Network Appliance, Inc., and the like, as well as one or more arrays of individual storage devices (e.g., an optical storage jukebox, a "Just a Bunch of Disks" (JBOD) array, or a Redundant Array of Independent Disks (RAID) system).

Electronic communication ranking module 102 is configured to assign one or more rankings to each electronic communication archived by archive module 100. Electronic communication ranking module 102 ranks an electronic communication according to both content and social factors, as described in more detail below. The rankings 114 generated by electronic communication ranking module 102 can be stored by archive module 100.

In this example, archive module 100 archives electronic communications sent from and/or received by messaging client 130, which is implemented on computing device 132. Messaging client 130 is a client of messaging server 140. Messaging client 160 can be an email client, an instant messaging client, a text messaging client (e.g., using Short Messaging Service (SMS), Multimedia Messaging Server (MMS), or the like), BlackBerry™ client, electronic bulletin board client, news feed client, or any other type of electronic messaging client. It is noted that electronic communications can include messages (such as email, text, and instant messages) sent according to a messaging protocol as well as other types of electronic documents that are used to communicate within an organization, such as voice mail files, electronic facsimile ("fax") files, word processing documents, and the like.

Computing device 130, messaging server 140, and archive module 100 are coupled by network 145. Network 145 can include one or more of a local area network (LAN) and a wide area network (WAN) such as the Internet. Network 145 can be implemented using a variety of different topologies and media, including electrical, optical, and/or wireless links.

In some embodiments, a network appliance 150 is coupled to one of the other components of the system shown in FIG. 1. In this example, network appliance 150 is interposed between network 145 and messaging server 140. Network appliance 150 can intercept electronic communications being conveyed to messaging server 140 and perform various operations (e.g., junk mail filtering, virus scanning, and the like) on the intercepted electronic communications.

In the illustrated system, when an electronic communication is sent to the user of messaging client 130, the message is initially sent to messaging server 140 via network appliance 150. The user can access the electronic communication via messaging client 130. At this point both the messaging server and the messaging client can have a copy of the electronic communication.

Archive module 100 can obtain a copy of the electronic communication in a variety of different ways. In one embodiment, archive module 100 accesses an application programming interface (API) provided by messaging server 140 to obtain a copy of the electronic communication. Archive module 100 can routinely (e.g., at prespecified intervals or in response to prespecified stimuli) poll messaging server 140 in order to obtain copies of new electronic communications received by messaging server 140 subsequent to the last time archive module 100 polled the messaging server.

Alternatively, archive module 100 can obtain a copy of an electronic communication by interacting with messaging client 130. For example, messaging client 130 can be configured to forward all or some electronic communications to archive module 100. Alternatively, messaging client 130 can present an API that allows archive module 100 to request electronic communications.

In yet another embodiment, all or some of the data stored by computing device 130 is regularly backed up, and archive server can obtain copies of electronic communications received by messaging client 130 from a backup of the data stored by computing device 130. For example, the user of computing device 130 may create a backup of one or more emails in a personal folder (PST) file. Archive module 100 can access the PST file and extract one or more electronic communications from that PST file.

In the system illustrated in FIG. 1, electronic communication ranking module 102 processes each electronic communication that is received by archive module 100. Electronic communication ranking module 102 can process electronic communications before, during, or after archival of the electronic communication.

Electronic communication ranking module 100 can, in some embodiments, be configured to selectively rank only certain communications. Information identifying which communications to rank can be provided to electronic communication ranking module 100 by an administrator. For example, an administrator can create a list of policies that identify which communications to rank.

While electronic communication ranking module 102 is shown as part of archive module 100 in the illustrated example, it is noted that electronic communication ranking module 102 can alternatively be implemented within any of a variety of different system components. For example, electronic communication ranking module 102 can be part of a record management system (e.g., as part of a record management server) or a content management system (e.g., as part of a content server).

In other embodiments, electronic communication ranking module 102 can be implemented as part of network appliance 150, messaging server 140, or messaging client 130. In situations in which electronic communication ranking module 102 is not part of archive module 100, archive module 100 can, in some embodiments, obtain the ranks generated by electronic communication ranking module 102 from the component that includes electronic communication ranking module 102. For example, electronic communication ranking module 102 can send the ranks to archive module 100 as the ranks are generated. Alternatively, archive module 100 can routinely poll electronic communication ranking module 102 for the ranks. In other embodiments, electronic communication ranking module 102 modifies the electronic communications to include the ranks (e.g., by incorporating the ranks into an unused field within each electronic communication), allowing archive module 100 to obtain the ranks when the electronic communications themselves are obtained.

In one alternative embodiment, electronic communication ranking module 102 is part of network appliance 150. In this embodiment, electronic communication ranking module 102 can rank electronic communications being sent to and/or from messaging server 140. If it is desired to selectively rank only certain electronic communications (as opposed to ranking all electronic communications), electronic communication ranking module 102 can maintain its own policies (e.g., in an administrator-provided configuration file) that identify which communications (e.g., based upon characteristics such as author, sender; receiver, content, storage location, creation date, size, and the like) should be ranked.

Electronic communication ranking module 102 can either incorporate the rankings into the electronic communications themselves (such that the modified electronic communications will be provided to messaging server 140 and then ultimately to archive module 100), store the rankings locally (to be provided to archive module 100 when the archive server requests them), or provide the documents directly to the archive module 100 (e.g., if electronic communication ranking is integrated with archive module 100, as shown in FIG. 1). If the rankings are stored or provided to archive module 100 directly, information identifying the electronic communication that is being ranked can also be stored or provided in order to allow each ranking to be correlated with a corresponding electronic communication.

In one embodiment, archive module 100 is implemented using Enterprise Vault™ and/or IM Manager™, available from Symantec Corp. of Cupertino, Calif. As already noted above, archive module 100 can be implemented separately from (e.g., on a different computing device than and/or as part of a different application than) electronic communication ranking module 102 in some embodiments. Additionally, in alternative embodiments, archive module 100 can be integrated with various other system components such as network appliance 150, messaging server 140, and messaging client 130.

Electronic communications are ranked based on both the social rankings of the parties that create and/or access the electronic communications and the content of the electronic communication. In some embodiments, these two ranks are combined into a single rank, while in other embodiments, both ranks are maintained and used (allowing each rank to be used independently of the other rank).

As noted above, the social ranking of an electronic communication is based upon the social rankings of the parties that create and/or access the electronic communications. For example, if an email is being ranked, the social ranking of the email can be based upon the ranks of the sender and/or the ranks of one or more of the recipients. Recipients include direct recipients (e.g., as identified in the "to" field of the email) as well as indirect recipients (e.g., as identified in the carbon copy "cc" or blind carbon copy "bcc" fields of the email). Similarly, if a electronic copy of a word processing document is being ranked, the social ranking can be based upon the ranks of the author (e.g., as identified in metadata included within or associated with the document) and/or the viewers (e.g., as identified in metadata that identifies users who have accessed the electronic copy of the document) of the document.

In some embodiments, social rankings are based upon static rankings assigned to each potential creator and/or viewer of an electronic communication. These rankings can be provided to electronic communication ranking module 102 in the form of a list, table, or other set of information that electronic communication ranking module 102 can access to determine the rank of a particular party.

In other embodiments, electronic communication ranking module 102 receives an initial set of rankings (or information usable to derive an initial set of rankings) and then modifies those rankings over time. For example, in one embodiment, electronic communication ranking module 102 first receives information identifying the organization's hierarchy. Electronic communication ranking module 102 identifies an initial rank for each party within the organization, based upon that party's place within the hierarchy. Electronic communication ranking module 102 then updates these initial ranks based upon the communications that are exchanged within the organization. For example, the rank of a party that primarily sends communications to and/or receives communications from one or more higher-ranked parties can be increased. If, for example, the organization is a business, the Chief Executive Officer (CEO) may be designated as the person with the highest rank. A party who exchanges communications with the CEO is more important than a party that does not. Accordingly, the rank of the party that communicates with the CEO can be increased relative to the rank of the party that does not communicate with the CEO. More details regarding how social rankings can be implemented are provided below with respect to FIG. 4.

Electronic communication ranking module 102 also generates rankings based on the content of each electronic communication. To generate content-based rankings, electronic communication ranking module 102 can either be preconfigured with information used to generate the rankings or be dynamically configured based on user rankings. If electronic communication ranking module 102 is preconfigured, electronic communication ranking module 102 can be provided with information that identifies how content-based rankings are to be generated. For example, electronic communication ranking module 102 can be provided with a list of keywords or phrases as well as information identifying the importance of each. Based on the number of different keywords and/or phrases within all or part (e.g., the header or title) of an electronic communication and the preconfigured information, electronic communication ranking module 102 can generate a content-based ranking for the electronic communication.

In embodiments in which the information used to generate content-based rankings is developed over time, electronic communication ranking module 102 initially has little or no information about how to rank specific content. Instead, users (e.g., individual users and/or other specialized enterprise personnel, such as administrators, managers, attorneys, or the like) rank communications manually. The communications and their corresponding ranks are provided to the electronic communication ranking module 102. Based upon this input, electronic communication ranking module 102 identifies ranking criteria and/or rules using active learning techniques. Electronic communication ranking module 102 can then begin to generate rankings automatically based upon the identified criteria and/or rules. More detail about one embodiment of a method for dynamically developing content-based ranking criteria and/or rules is presented below with respect to FIG. 5.

Over time, an organization's needs with respect to ranking may change. For example, as an organization's focus or policy changes, certain types of content may become more or less valuable. Accordingly, in some embodiments, electronic communication ranking module 102 can be reconfigured or otherwise updated to change its existing ranking policies. For example, if an organization is restructured, a new initial set of social ranking information can be provided to electronic communication ranking module 102. In order to update the ranking mechanism(s) in use to reflect changed the organization's changed needs, electronic communication ranking module 102 can be reinitialized and/or reconfigured (e.g., by providing new static or initial configuration information to electronic communication ranking module 102).

Alternatively, electronic communication ranking module 102 can provide a user interface that allows the current ranking rules and/or criteria to be viewed and/or modified. In such embodiments, an administrator can update the ranking information via the user interface, without needing to fully reinitialize electronic communication ranking module 102.

The ranks assigned to electronic communications can be used for a variety of different purposes by an archive module such as archive module 100 of FIG. 1. The ranks can be used by archive servers, search engine and/or indexing modules, replication modules, backup modules, network appliances, security modules, and the like. Example uses including ranking search results (e.g., electronic communications with higher rankings will be placed closer to the top of the list of search results), ordering search indices in rank order, making indices scalable by performing different levels of indexing for different ranks (e.g., electronic communications with high rankings are indexed in entirety, while only the titles of electronic communications with lower rankings are indexed), prioritizing archival and backup processes (e.g., communications having higher ranks will be copied prior to those of lesser rank), determining retention categories (e.g., communications having higher ranks are retained longer than communications of lower ranks). Other uses include determining how to backup electronic communications (e.g., higher-ranked communications can be backed up to disk while lower-ranked communications are backed up to tape or not backed up at all), sorting electronic communications, and when duplicating (e.g., via replication) copies of communications for use in disaster recovery or for compliance purposes (e.g., higher-ranked communications will be duplicated before lower-ranked communications).

Rankings can also be used by system components other than archive servers. For example, a network appliance can use the rankings of electronic communications to control how the electronic communications are communicated throughout the system (e.g., certain recipients may not be allowed to access electronic communication of a certain rank) as well as whether certain electronic communications are allowed outside of the system (e.g., certain high-ranking electronic communications may not be allowed outside of a corporate intranet).

Figure 2:
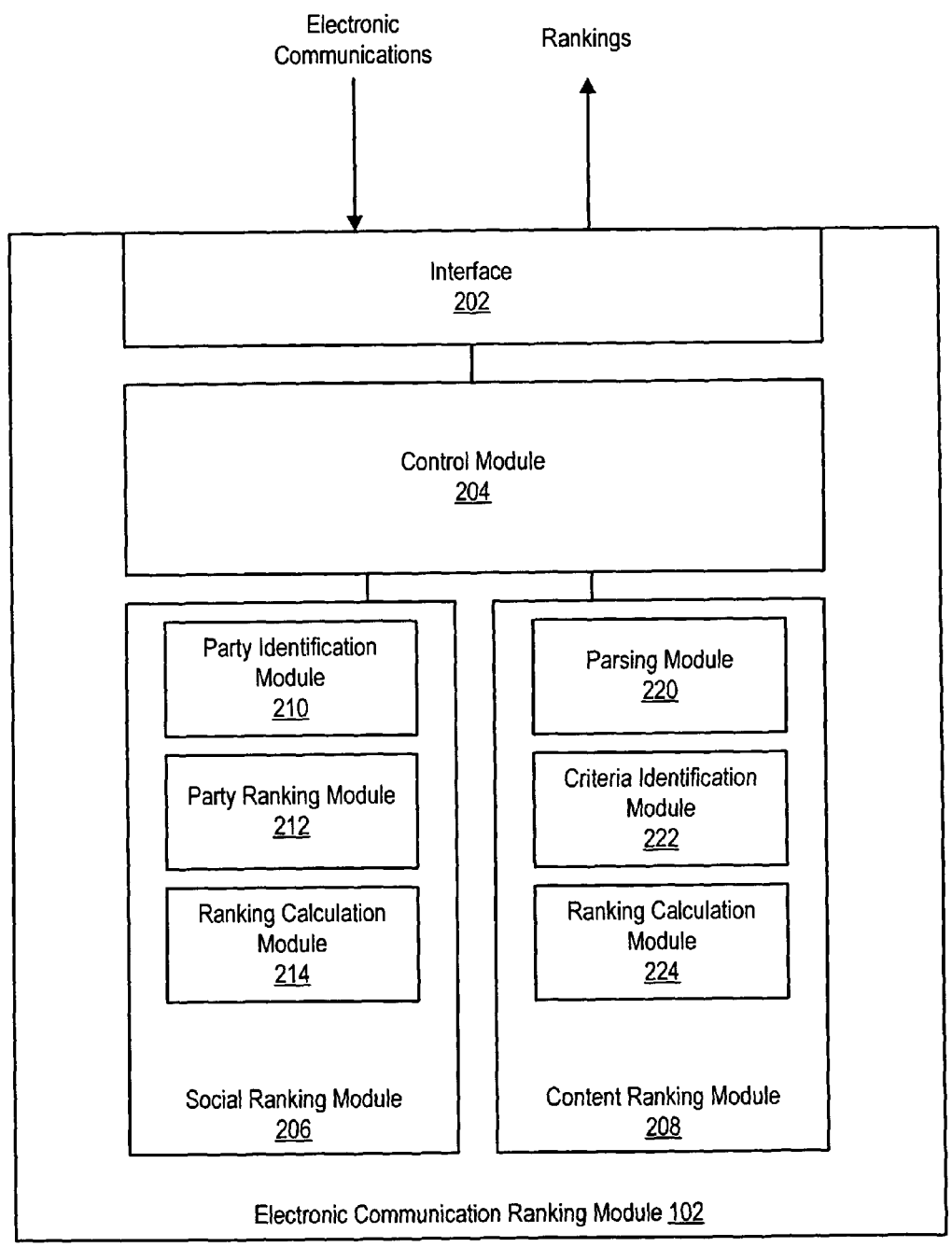
FIG. 2 is a block diagram of an electronic communication ranking module, according to one embodiment of the present invention.

FIG. 2 is a block diagram of one embodiment of an electronic communication ranking module 102. Electronic communication ranking module 102 can be implemented as software, hardware, or a combination of both. Electronic communication ranking module 102 can be implemented independently or as part of an archive server, messaging server, network appliance, or messaging client.

As shown, electronic communication ranking module 102 includes an interface 202, a control module 204, a social ranking module 206, and a content ranking module 208. Social ranking module 206 includes party identification module 210, party ranking module 212, and ranking calculation module 214. Content ranking module 208 includes parsing module 220, criteria identification module 222, and ranking calculation module 224.

Interface 202 is configured to receive electronic communications to be ranked and to output rankings of those electronic communications. In one embodiment, interface 202 is configured to obtain electronic communications by polling a messaging server for new electronic communications, extracting backed-up electronic communications from a backup, intercepting electronic communications being sent to a messaging server, or performing any other technique to obtain a desired set of electronic communications.

Interface 202 can include both logical interfaces (e.g., software ports) and physical interfaces. While interface 202 is shown as part of electronic communication ranking module 102, it is noted that interface 202 can also be part of another module (e.g., an archive module) with which electronic communication ranking module 102 is integrated.

Control module 204 is configured to coordinate the actions of the other modules within electronic communication ranking module 102. Control module 204 can cause all or part of an electronic communication received via interface 202 to be provided to one or both ranking modules. Control module 204 can also receive rankings generated by social ranking module 206 and content ranking module 208 for a given electronic communication. If desired, control module 206 can generate a single ranking based upon the rankings received from social ranking module 206 and content ranking module 208. Control module 206 can also store the final ranking(s) for future access (along with information identifying the electronic communication described by the rankings), modify the electronic communication to include the final ranking(s), and/or provide the final ranking(s) to an archive server or other consumer of communication rankings.

Control module 204 can also implement a user interface that allows an administrator to configure electronic communication ranking module 102. This user interface can allow an administrator to provide configuration information (e.g., identifying algorithms to use when generating particular rankings for particular types of electronic communications, identifying which parties and/or content to consider when generating rankings for particular types of electronic communications, and the like) to electronic communication ranking module 102. This user interface can also allow an administrator to view and/or modify current configuration information. The user interface can also allow an administrator to provide, view, and/or modify information used to rank parties within an organization and/or to rank particular content that may appear in electronic communications.

Social ranking module 206 is configured to rank electronic communications based upon the social status of one or more parties who authored and/or accessed the electronic communication. Social ranking module 206 is configured to access social ranking information (e.g., via interface 202) that identifies the rank of each party to be considered in the ranking. The particular party or parties to consider when ranking an electronic communication can vary (e.g., depending upon the type of electronic communication being ranked). Configuration information (either prespecified or provided by an administrator) associated with social ranking module 206 can identify the particular party or parties to use when generating a ranking for each type of electronic communication.

Thus, when all or part of a new electronic communication is provided to social ranking module 206 for ranking, party identification module 210 can access configuration information (e.g., via interface 202) to determine which party (e.g., author, sender, recipient, viewer, and the like) or parties to use in the ranking. For example, the configuration information associated with emails can indicate that the sender and recipients of each email should be used when ranking emails. Similarly, the configuration information associated with word processing documents can indicate that the author of each word processing document should be used when ranking word processing documents.

Based on the configuration information, party identification module 210 then parses the electronic communication (or its associated metadata) to obtain the identity of each party for that specific electronic communication. The type of party identified in the configuration information can indicate which portion of the electronic communication (or its associated metadata) should be parsed to obtain the identity of each party. For example, if the configuration information indicates that the sender of an email should be used, party identification module 210 can obtain the identity of the sender from the "from" field of the email. In situations in which metadata is accessed to obtain the identity of a particular party, the metadata can either be provided to party identification module 210 (e.g., along with the electronic communication with which the metadata is associated) or obtained by party identification module 210 (e.g., by interacting with a file system).

After obtaining the identity of each party to be used in the ranking, party identification module 210 can then provide the identity of each party to party ranking module 212. Party ranking module 212 receives the identity of each party and looks up the ranking associated with each identified party. Party ranking module 212 can look up the ranking within a set of social ranking information that has been provided to and/or is maintained by social ranking module 206. Party ranking module 212 obtains the ranking of each identified party and provides the ranking(s) to ranking calculation module 214.

Ranking calculation module 214 receives one or more rankings from party ranking module 212 that correspond to a particular electronic communication. Ranking calculation module 214 calculates a social ranking for the electronic communication based upon the rankings received from party ranking module 212 and provides the social ranking to control module 204. In some embodiments, the social ranking is simply the sum or average of the individual party ranking(s) associated with the electronic communication.

In other embodiments, the social ranking is calculated by inputting the individual party ranking(s) to a prespecified algorithm (e.g., obtained from the configuration information). Different algorithms can be used to rank different types of electronic communications. The algorithm can give different weights to different parties, so that some parties' rankings have more of an effect on the resulting social ranking than others. For example, one algorithm for calculating the social ranking of an email can weigh the ranks of the sender and receiver(s) (e.g., by multiplying the ranks by different multiplicands) such that the rank of the sender of an email will have more of an effect on the email's ranking than the rank(s) of the recipient(s).

In one embodiment, the ranking of an email message is defined to be the weighted sum of the ranking of the sender of the email as well as the ranking of the receiver(s) of the email. If an email is sent to a distribution list, the email's ranking is based upon the rank of all parties that send emails to the distribution list as well as the ranking of each recipient identified in the distribution list.

As noted above, social ranking module 206 uses social ranking information that identifies the current social rank of each party that can potentially be associated with an electronic communication. In some embodiments, this social ranking information is static. In such embodiments, a copy of the social ranking information (or information from which the social ranking information can be derived) is provided to electronic communication ranking module 102 and stored as part of the configuration information.

In other embodiments, social ranking information is dynamically updated. In these embodiments, social ranking module 206 is configured to receive information that identifies the initial social ranking of each party in an organization or information (e.g., such as information that identifies each party's place within an organizational hierarchy) from which such initial rankings can be derived. Social ranking module 206 then monitors the exchange of electronic communications within the organization and updates the initial social rankings based upon the monitored exchange. For example, if an initially lower-ranked party primarily exchanges emails with significantly higher-ranked parties, the social ranking of the lower-ranked party can be increased. In some embodiments, several types of social rankings are assigned to each party, at least initially, and used to compute a final social ranking for each party. More detail regarding how the rankings can be updated is presented below with respect to FIG. 4.

Content ranking module 208 is configured to receive all or part of an electronic communication, generate a content-based ranking of that electronic communication, and return the generated ranking to control module 202. Parsing module 220 is configured to search an electronic communication for key words or phrases that are used in generating a content-based rank.

Parsing module 220 can search the electronic communication for keywords or key phrases that are identified in configuration information associated with electronic communication ranking module 102. This configuration information can be static or dynamic. In embodiments that use static configuration information to generate content rankings, the static configuration information is provided by an administrator and accessed by parsing module 220.

In other embodiments, the configuration information identifying words and/or phrases to be used in generating content rankings is generated dynamically. In these embodiments, minimal (or even no) initial content ranking configuration information is provided; instead, criteria identification module 222 monitors and processes pre-ranked electronic communications in order to derive a set of ranking criteria. These criteria can identify the particular key words and/or phrases used by parsing module 220. More details regarding how criteria identification module 222 can generate ranking criteria are provided below with respect to FIG. 5.

Once parsing module 220 has identified the keywords or key phrases within the electronic communication, parsing module 220 provides these key words and/or phrases to ranking calculation module 224. Parsing module 220 can also identify the number of occurrences of each key word and/or key phrase within the electronic communication.

Based on the information received from parsing module 220, ranking calculation module 224 generates a content-based ranking for the electronic communication. Like ranking calculation module 214, ranking calculation module 224 can generate the ranking based upon an algorithm. This algorithm can be prespecified or generated by criteria identification module 222.

As noted above, control module 204 can receive the social ranking calculated by social ranking module 206 and the content-based ranking calculated by content ranking module 208. Control module 204 can store these rankings along with information associating the rankings with the electronic communication being ranked. These rankings can, in one embodiment, be stored in a ranking database. Alternatively (or additionally), control module 204 can modify the original electronic communication to include the rankings (e.g., by inserting the rankings into a previously-unused field of the electronic communication).

In some embodiments, instead of using the two rankings individually, control module 204 generates a single ranking, based on the social and content-based rankings. Control module 204 can generate this ranking by inputting the social and content-based rankings to a prespecified algorithm (e.g., included within the configuration information associated with electronic communication ranking module 102). Alternatively, control module 204 can simply sum or average the social and content-based rankings to generate the final ranking. Control module 204 can then save the ranking and/or modify the electronic communication to include the ranking (either of these actions can be performed instead of or in addition to saving the social and content-based rankings and/or modifying the electronic communication to include the social and content-based rankings). The ranking can be stored in a ranking database instead of or in addition to the individual content-based and social rankings.

As noted above, less than all of an entire electronic communication can be used when generating a social and/or content-based ranking. For example, the configuration information can indicate that, for certain types of emails, only the email title should be used in generating a content-based ranking. Similarly, if the body of an email is not used in generating a social ranking, only the email header (e.g., information identifying the sending and receiving parties) can be provided to social ranking module 206. Thus, control module 204 can be configured to access configuration information associated with a particular type of electronic communication to determine which portion of an electronic communication should be provided to each ranking module.

While the functionality of electronic communication ranking module 102 has been shown as being subdivided into particular modules in the example of FIG. 2, it is noted that the functionality can be subdivided differently (or not at all) in other embodiments. Furthermore, some of the functionality described herein may be omitted in other embodiments (e.g., if only one type of electronic communication is to be ranked, it may not be necessary to include the functionality to handle other types of electronic communications). Other embodiments may include other functionality instead of and/or in addition to the functionality described above.

Figure 3:
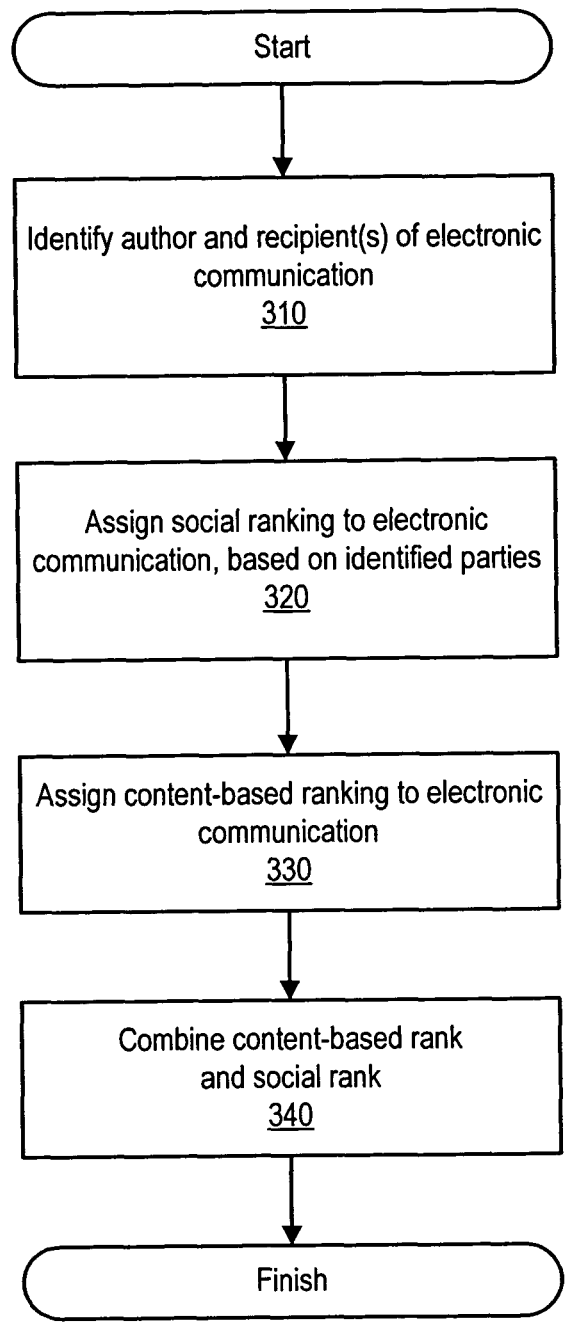
FIG. 3 is a flowchart of a method of ranking an electronic communication based on both social factors and content, according to one embodiment of the present invention.

FIG. 3 is a flowchart of a method of ranking an electronic communication based on both social factors and content. This method can be performed by an electronic communication ranking module like module 102 of FIGS. 1 and 2.

The method begins at 310, when the author (e.g., the sender of an email) and recipients (e.g., the recipients of an email or the parties who access a word processing document) of an electronic communication are identified. Based upon the identified parties, a social ranking is assigned to the electronic communication, as shown at 320.

At 330, a content-based ranking is assigned to the electronic communication. This ranking is assigned based upon the content included within all or part of the electronic communication.

At 340, the content-based ranking and the social ranking are combined to generate a combined ranking. This ranking, as well as the individual rankings generated at 320 and 330, can be stored in a ranking database along with information identifying the ranked electronic communication. Alternatively (or additionally), the electronic communication itself can be modified to include one or more of the rankings.

Figure 4:
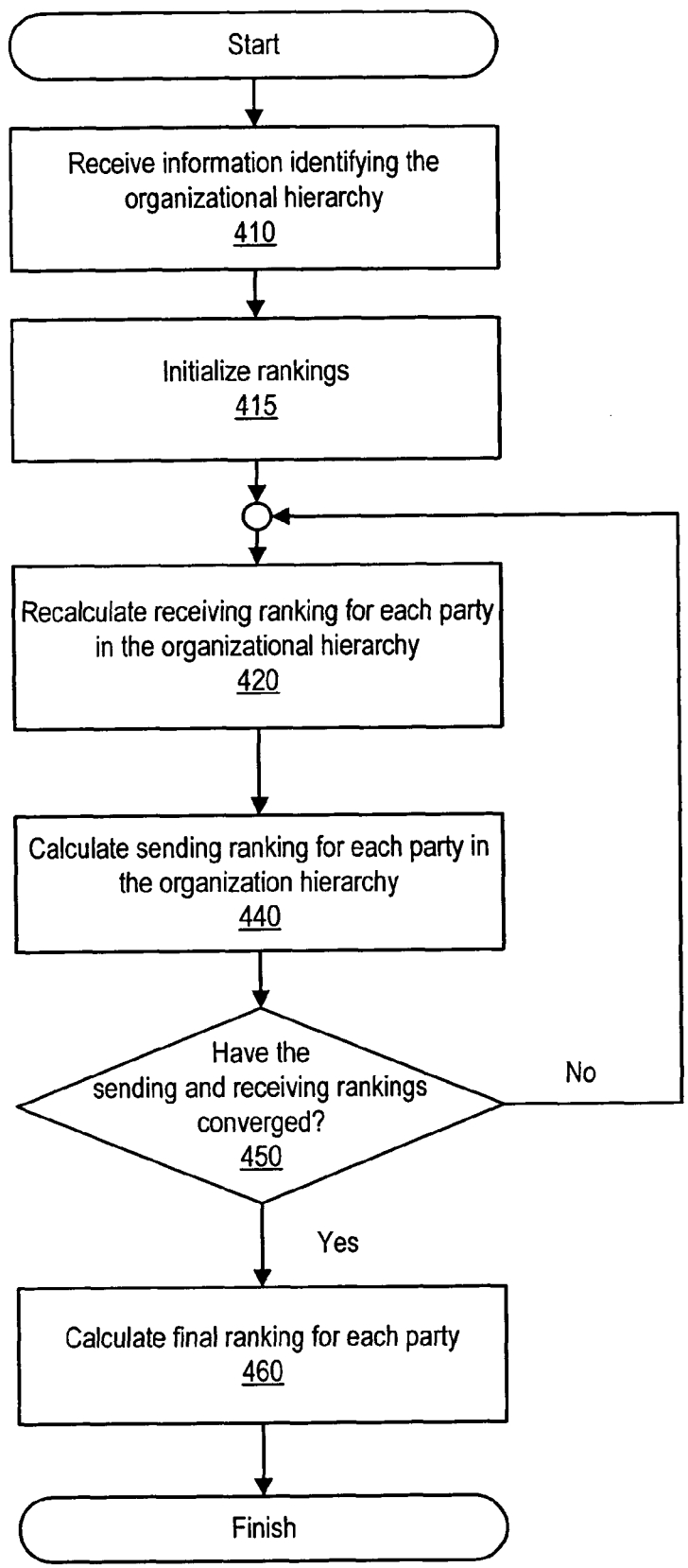
FIG. 4 is a flowchart of a method of dynamically identifying social rankings of parties, according to one embodiment of the present invention.

FIG. 4 is a flowchart of a method of dynamically identifying social rankings of parties. This method can be performed by a social ranking module such as social ranking module 206 of FIG. 2.

The method begins at 410, when the social ranking module receives information identifying the organizational hierarchy. This hierarchy can be presented in a file or database that represents the hierarchy of parties (e.g., employees, officers, and the like) within an organization.

Rankings (receiving and/or sending) for each party identified within the organizational hierarchy are initialized at 415. In this example, each party is assigned both a sending ranking and a receiving ranking. The rankings can be initialized such that parties at the top of the hierarchy (e.g., such as corporate officers) receive high initial receiving and sending rankings while parties near the bottom of the hierarchy (e.g., parties working in entry-level positions) receive low initial receiving rankings. Thus, the initial rankings calculated at 415 are based upon the parties' status within the organization, as identified by the organizational hierarchy.

The parties within the organization exchange emails (or other electronic communications, such as word processing documents, instant messages, voice mails, and the like), and these exchanges are tracked by the social ranking module (e.g., by parsing the header fields within or other metadata associated with the communication). The social ranking module can monitor the exchange of communications by snooping or otherwise monitoring communication exchanges (e.g., email traffic, instant messaging traffic, file access, and the like) within the organization.

Based upon the observed communication exchanges, the receiving rank for each party identified within the organizational hierarchy is recalculated, as shown at 420. For a particular party, the new receiving rank is recalculated based upon the sending ranks of all parties that have provided communications to the party whose receiving rank is being recalculated. In one embodiment, for example, the new receiving rank can be based upon both the prior version of the receiving rank as well as a weighted average (e.g., weighted based upon number of communications provided by each sending party) of the sending parties' sending ranks.

Based upon the observed communication exchanges, the sending ranking of each party in the organizational hierarchy is also recalculated, as shown at 440. The sending ranking of a party is calculated based upon the receiving rankings of parties with which the party communicates. For example, if a party sends emails to several corporate officers, the receiving rankings of the corporate officers is used to calculate the sending rank of the party that sent the emails.

If the sending and receiving rankings for each party have converged (e.g., if, for each party in the organizational hierarchy, the sending and receiving rankings are the same or nearly the same), as determined at 450, a final ranking is calculated for each party (e.g., based upon the converged sending and receiving ranking), as shown at 460. For example, if a given party has a sending ranking of 0.450 and a receiving ranking of 0.460, and convergence occurs when the two rankings differ by less than 0.02, the final ranking for that party can be calculated as 0.455, the average of the party's sending and receiving rankings. The final ranking calculated at 460 can then be used to generate rankings of electronic communications sent or received by the ranked party.

If the rankings for each party have not yet converged, operations 420 and 440 can be repeated. Based upon the sending rankings and the exchange of emails or other electronic communications, new receiving rankings can be calculated for each party (e.g., by re-performing operation 420). In this iteration, the new receiving ranking for a party is calculated based upon the sending rankings of all parties that have sent communications to the party. Thus, the receiving ranking of a party that receives a significant number of emails from parties with high sending rankings can be increased.

In some embodiments, the sending rankings and receiving rankings are computed at substantially the same time each iteration (e.g., operations 420 and 440 are performed at substantially the same time). The exchange of email (or other electronic communication exchange) can be monitored throughout the performance of one or more other operations (e.g., operations 420, 440, and 450) of FIG. 4.

In one embodiment, the parties are identified by email addresses and an Email Communication Network (ECN) is implemented to monitor the exchange of emails between email addresses. An ECN of an organization is a directed graph that has employees as nodes and email communication between any two nodes is represented as an edge. Incoming emails contribute to the in-degree (e.g., receiving ranking) of a node, and outgoing mails as out-degree (e.g., sending ranking) of the node.

Figure 5:
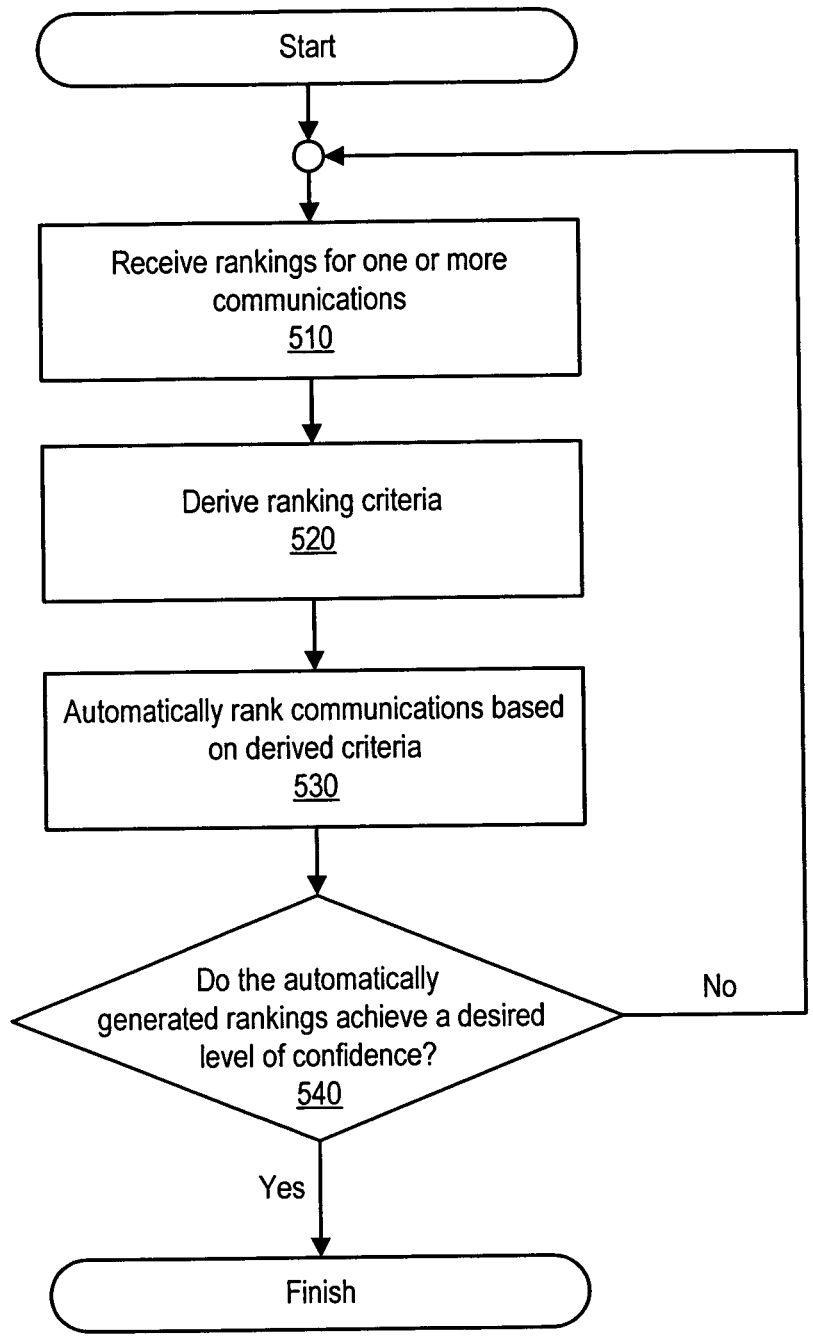
FIG. 5 is a flowchart of a method of dynamically identifying criteria for use in generating content-based rankings, according to one embodiment of the present invention.

FIG. 5 is a flowchart of a method of dynamically identifying criteria for use in generating content-based rankings. This method can be performed by a component such as content ranking module 208 of FIG. 2.

The method begins at 510, when rankings for one or more electronic communications are received. In embodiments in which the content-based rankings are dynamically developed, individual users and enterprise personnel (e.g. administrators, legal personnel, and the like) can be asked to rank incoming emails manually. A user interface for allowing users to rank electronic communications can be provided within each client (e.g., an email client) used to access the electronic communications. These rankings are provided to the content ranking module along with the ranked electronic communications.

Using the rankings provided at 510, the content ranking module identifies the ranking criteria using active learning methods (e.g., Bayesian, decision-tree, or committee-based methods). These methods can involve supervision by an administrator who routinely monitors and/or verifies the derived criteria.

At some point (e.g., after an administrator has determined that the content ranking module has correctly derived rules based upon enterprise- and/or user-provided rankings), the content ranking module can also begin to automatically rank electronic communications based upon the criteria derived from the user-provided rankings, as shown at 530. If the automatically-generated rankings achieve a desired level of confidence (e.g., if the automatically-generated rankings match the user-provided rankings within a prespecified margin of error), as determined at 540, users can stop manually ranking the electronic communication and the content ranking module can assume full responsibility for generating rankings. If the desired level of confidence has not been achieved, users can continue to manually rank communications and the content ranking module can continue to derive the ranking criteria (by repeating operations 510, 520, and 530, as shown in FIG. 5).

Determining whether the desired level of confidence has been achieved can be performed by comparing the automatically generated rankings of each electronic communication with the corresponding manually generated rankings. Alternatively, only certain electronic communications are examined (e.g., certain emails can be randomly selected for review to determine whether the desired level of confidence has been achieved).

In one embodiment, there are several phases of operation in order to derive the criteria used to perform content-based ranking. In the first phase, enterprise personnel (e.g. administrators and legal personnel) perform operation 510 by ranking incoming emails using enterprise policies and rules. Predefined enterprise rules can also be applied at this stage. For example, many enterprises already set rules on gateways or message transfer agents (MTAs) (e.g., Microsoft Exchange™) for email classification, and these rules can be used for initial rankings.

Once the content ranking module has derived the rules based upon the rankings provided by the enterprise personnel, individual users can begin performing operation 510 by generating rankings (e.g., using a special interface provided in each email client). For example, users can rank their incoming emails.

In the next phase, the content ranking module begins performing operation 530 by ranking electronic communications automatically. Initially, the content ranking module can first verify each rank with a user or an administrator (e.g., when a user selects to send an email, the email client can interact with the content ranking module, causing the content ranking module to generate a ranking and verifying that ranking with the user before actually sending the email). In some embodiments, this phase may be omitted.

Other operations can be performed in addition to and/or instead of those operations shown in FIGS. 3, 4, and 5. Additionally, the operations shown in each of FIGS. 3, 4, and 5 can be performed in different orders than shown in the figures.

Figure 6:
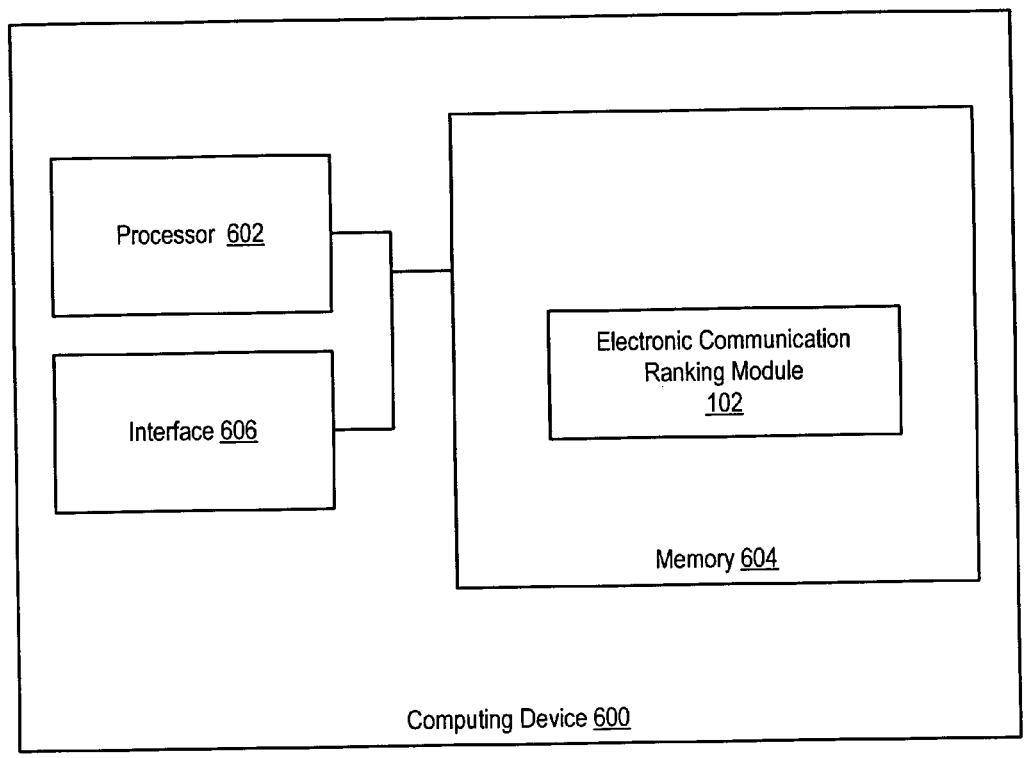
FIG. 6 is a block diagram of a computing device that implements an electronic communication ranking module, according to one embodiment of the present invention.

FIG. 6 is a block diagram of a computing device 400 that implements an electronic communication ranking module. FIG. 6 illustrates how certain elements of electronic communication ranking module 102 can be implemented in software. Computing device 600 can be a personal computer, network appliance, server, personal digital assistant, mobile phone, storage controller (e.g., an array controller, tape drive controller, or hard drive controller), or the like.

As illustrated, computing device 600 includes one or more processors 602 (e.g., microprocessors, Programmable Logic Devices (PLDs), or Application Specific Integrated Circuits (ASICs)) configured to execute program instructions stored in memory 604. Memory 604 can include various types of RAM (Random Access Memory), Read Only Memory (ROM), Flash memory, Micro Electro-Mechanical Systems (MEMS) memory, magnetic core memory, and the like. Memory 604 can include both volatile and non-volatile memory. Computing device 600 also includes one or more interfaces 606. Processor 602, interface 606, and memory 604 are coupled to send and receive data and control signals by a bus or other interconnect.

Interface 606 can include a network interface to various networks and/or interfaces to various peripheral buses. For example, interface 606 can include a network interface that allows electronic communication ranking module 102 to communicate with an archive server (if the electronic communication ranking module 102 is not integrated with the archive server) or a messaging server. Thus, interface 606 can include an interface to a network, such as network 145 of FIG. 1. Interface 606 can also include an interface to one or more storage devices (e.g., archive media 115 of FIG. 1). Thus, electronic communication ranking module 102 can write documents to an archive media via interface 606.

In this example, program instructions and data executable to implement all or part of electronic communication ranking module 102 are stored in memory 604. The program instructions and data implementing electronic communication ranking module 102 can be stored on various computer readable media such as memory 604. In some embodiments, such software is stored on a computer readable medium such as a Compact Disc (CD), Digital Versatile Disc (DVD), hard disk, optical disk, tape device, floppy disk, and the like). In order to be executed by processor 602, the instructions and data can be loaded into memory 604 from the other computer readable medium. The instructions and/or data can also be transferred to computing device 600 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   parsing an electronic communication for keywords, wherein
      the electronic communication comprises a message sent from a sender of the electronic communication to a receiver of the electronic communication;
   identifying one or more of the keywords within the electronic communication, in response to the parsing;
   receiving initial content ranking information, wherein
      the initial content ranking information identifies initial values associated with different content;
   assigning a rank to the electronic communication, wherein the assigning the rank comprises:
      assigning a content-based rank to the electronic communication, wherein
         the assigning the content-based rank is based at least in part on the one or more of the keywords, and
         the assigning the content-based rank is dependent upon the initial content ranking information; and
      assigning a social rank to the electronic communication based at least in part on a sender social rank and a receiver social rank, wherein
         the sender social rank is assigned to the sender of the electronic communication,
         the sender social rank is calculated based on a social rank of at least one party to whom the sender has sent electronic communications and a social rank of at least one party who has sent electronic communications to the sender,
the receiver social rank is assigned to the receiver of the electronic communication, and
the parsing, the identifying, the assigning the rank, the assigning the content-based rank, and the assigning the social rank are performed by a computing device implementing an electronic communication ranking module;
returning a list of search results comprising information identifying the electronic communication, wherein
an order of the list is dependent upon the rank assigned to the electronic communication; and
identifying a priority of the electronic communication, dependent upon the rank assigned to the electronic communication, wherein
the priority determines when, relative to a time at which a copy of another electronic communication is made, a copy of the electronic communication will be made.

2. The method of claim 1, wherein
the rank comprises the content-based rank and the social rank.

3. The method of claim 1, further comprising:
calculating the rank, wherein
the rank is dependent upon the content-based rank and the social rank.

4. The method of claim 1, further comprising:
receiving initial social information, wherein
the initial social information identifies each of a plurality of persons;
each of the plurality of persons can be at least one of the author of the electronic communication and the receiver of the electronic communication; and
the assigning the social rank is dependent upon the initial social information.

5. The method of claim 4, wherein the initial social information comprises information identifying an organizational hierarchy.

6. The method of claim 1, further comprising:
storing the rank in a database of ranking information, wherein the rank is associated with information identifying the electronic communication.

7. The method of claim 1, further comprising:
modifying the electronic communication, wherein
subsequent to the modifying, the electronic communication comprises the rank.

8. The method of claim 1, further comprising:
controlling at least one of: transmission of and access to the electronic communication, dependent upon the rank assigned to the electronic communication.

9. An apparatus comprising:
a processor; and
a non-transitory memory coupled to the processor and storing program instructions executable by the processor to
parse an electronic communication for keywords, wherein
the electronic communication comprises a message sent from a sender of the electronic communication to a receiver of the electronic communication;
identify one or more of the keywords within the electronic communication, in response to parsing the electronic communication for keywords;
receive initial content ranking information, wherein the initial content ranking information identifies initial values associated with different content;
assign a social rank to the electronic communication, wherein
the social rank is based in part on a sender social rank and a receiver social rank,
the sender social rank is assigned to a sender of the electronic communication,
the sender social rank is calculated based on a social rank of at least one party to whom the sender has sent electronic communications and a social rank of at least one party who has sent electronic communications to the sender, and
the receiver social rank is assigned to a receiver of the electronic communication;
assign a content-based rank to the electronic communication, wherein
assigning the content-based rank is based at least in part on the one or more of the keywords, and
the assigning the content-based rank is dependent upon the initial content ranking information; and
return a list of search results comprising information identifying the electronic communication, wherein
an order of the list is dependent upon the rank assigned to the electronic communication; and
identify a priority of the electronic communication, dependent upon the rank assigned to the electronic communication, wherein
the priority determines when, relative to a time at which a copy of another electronic communication is made, a copy of the electronic communication will be made.

10. The apparatus of claim 9, further comprising:
an archive server configured to archive electronic communications.

11. The apparatus of claim 10, wherein the instructions are further executable to:
intercept electronic communications being conveyed to or from a messaging server.

12. The apparatus of claim 9, wherein the instructions are further executable to:
implement a messaging client.

13. The apparatus of claim 9, further comprising:
a messaging server.

14. A non-transitory computer readable medium comprising program instructions executable to:
parse an electronic communication for keywords, wherein
the electronic communication comprises a message sent from a sender of the electronic communication to a receiver of the electronic communication;
identify one or more of the keywords within the electronic communication, in response to the parsing;
receive initial content ranking information, wherein
the initial content ranking information identifies initial values associated with different content;
assign a rank to an electronic communication, wherein assigning the rank comprises:
assigning a content-based rank to the electronic communication, wherein
the assigning the content-based rank is based at least in part on the one or more of the keywords, and
the assigning the content-based rank is dependent upon the initial content ranking information;
assigning a social rank to the electronic communication based at least in part on a sender social rank and a receiver social rank, wherein
the sender social rank is assigned to a sender of the electronic communication, the sender social rank is calculated based on a social rank of at least one party to whom the sender has sent electronic communications and a social rank of at least one party who has sent electronic communications to the sender, and the receiver social rank is assigned to a receiver of the electronic communication; and return a list of search results comprising information identifying the electronic communication, wherein an order of the list is dependent upon the rank assigned to the electronic communication; and identify a priority of the electronic communication, dependent upon the rank assigned to the electronic communication, wherein the priority determines when, relative to a time at which a copy of another electronic communication is made, a copy of the electronic communication will be made.

15. The non-transitory computer readable medium of claim 14, wherein the program instructions are further executable to:

access initial social information, wherein the initial social information identifies each of a plurality of persons;

each of the plurality of persons can be at least one of the author of the electronic communication and the receiver of the electronic communication; and the social rank assigned to the electronic communication is dependent upon the initial social information.

16. The non-transitory computer readable medium of claim 14, wherein the program instructions are further executable to:

modify the electronic communication, wherein subsequent to the modifying, the electronic communication comprises the rank.

* * * * *